United States Patent [19]

Webster

[11] 4,332,261
[45] Jun. 1, 1982

[54] AUTOMATIC HYDRAULIC NEUTRALIZING MECHANISM

[75] Inventor: E. Graham Webster, New Holland, Pa.

[73] Assignee: Sperry Corporation, New Holland, Pa.

[21] Appl. No.: 190,152

[22] Filed: Sep. 24, 1980

[51] Int. Cl.³ ............................................. A01D 90/10
[52] U.S. Cl. .................................. 130/27 R; 56/16.6; 414/523
[58] Field of Search ......................... 130/27 R, 27 AB; 56/16.6, 206; 414/505, 523

[56] References Cited

U.S. PATENT DOCUMENTS

| | | | |
|---|---|---|---|
| 3,626,472 | 12/1971 | Rowland-Hill | 130/27 T |
| 3,638,812 | 2/1972 | Ryczek | 414/523 |
| 3,742,686 | 7/1973 | Rowland-Hill | 130/27 T |
| 3,834,564 | 9/1974 | Laurent et al. | 414/523 |
| 3,995,645 | 12/1976 | Rowland-Hill | 130/27 T |
| 4,180,966 | 1/1980 | Zen | 56/208 |

*Primary Examiner*—Jay N. Eskovitz
*Attorney, Agent, or Firm*—Frank A. Seemar; Larry W. Miller

[57] ABSTRACT

A combine has an unloading tube containing an auger, which tube is moveable between a retracted position and an unloading position. Movement is controlled by the operator from the operator's platform by a hydraulic system. The system includes an actuator cooperating with a valve to control a hydraulic cylinder. The cylinder is interconnected to the tube causing movement thereto.

1 Claim, 6 Drawing Figures

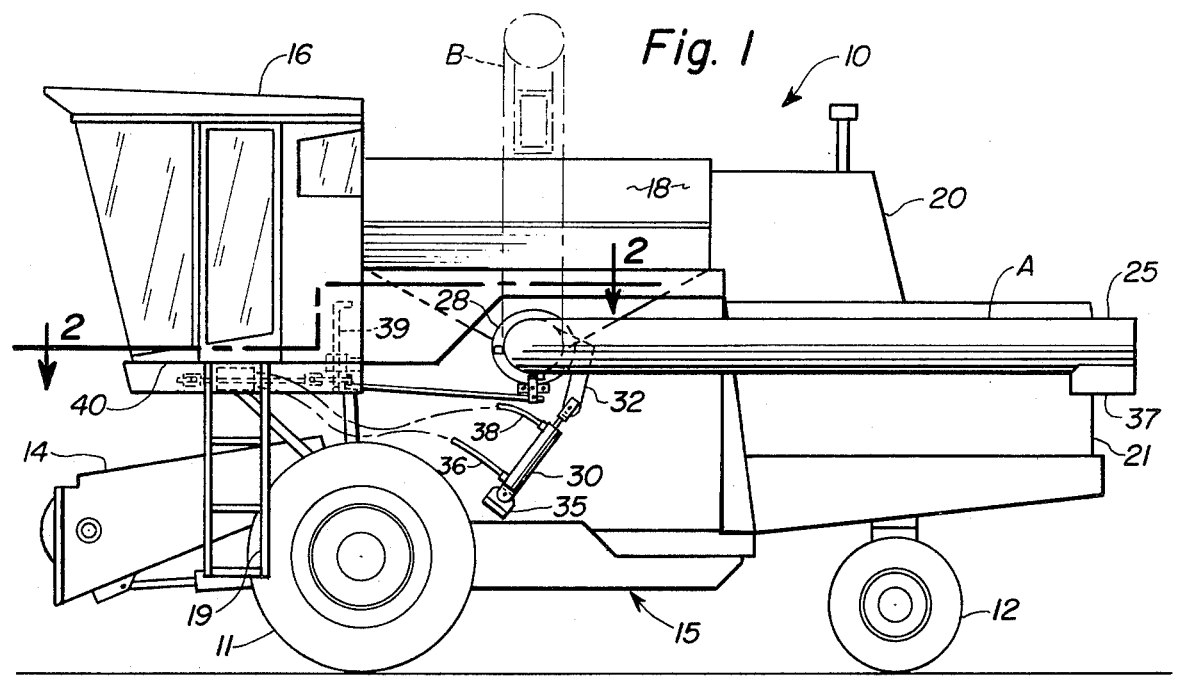
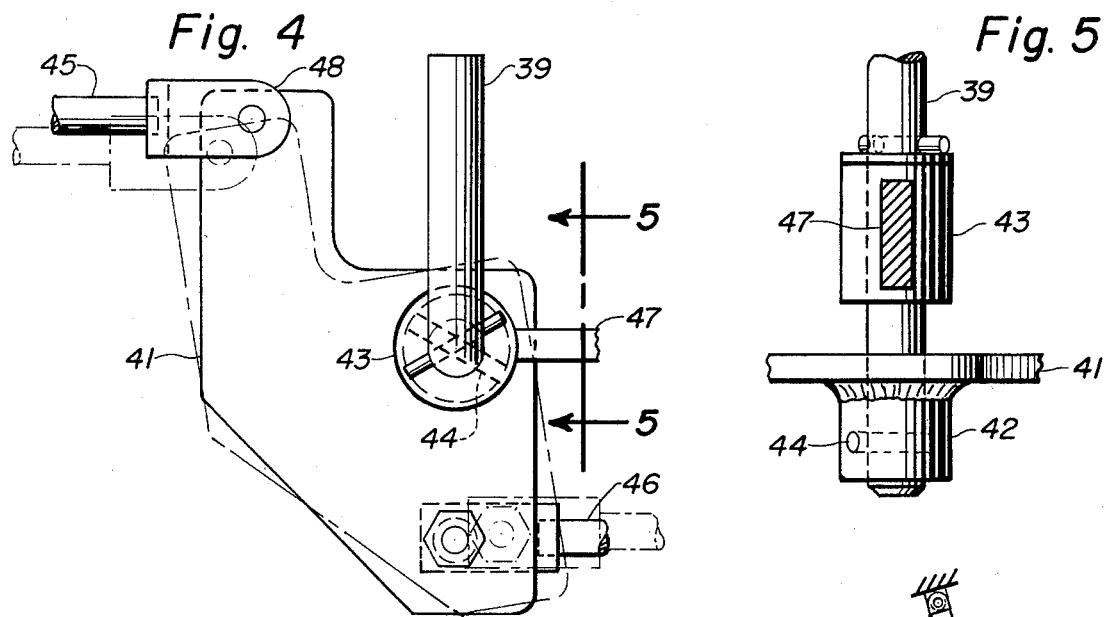
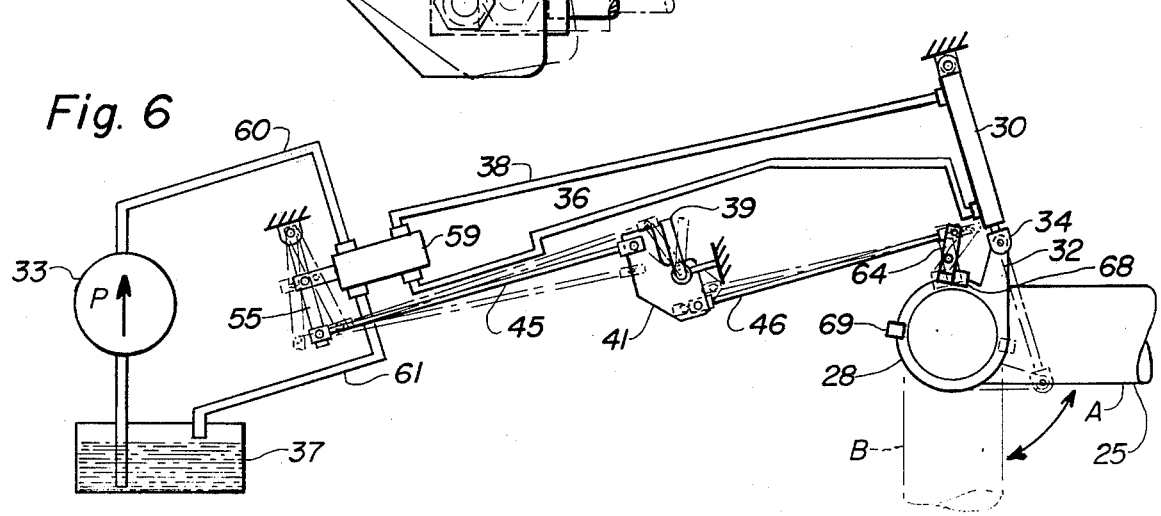

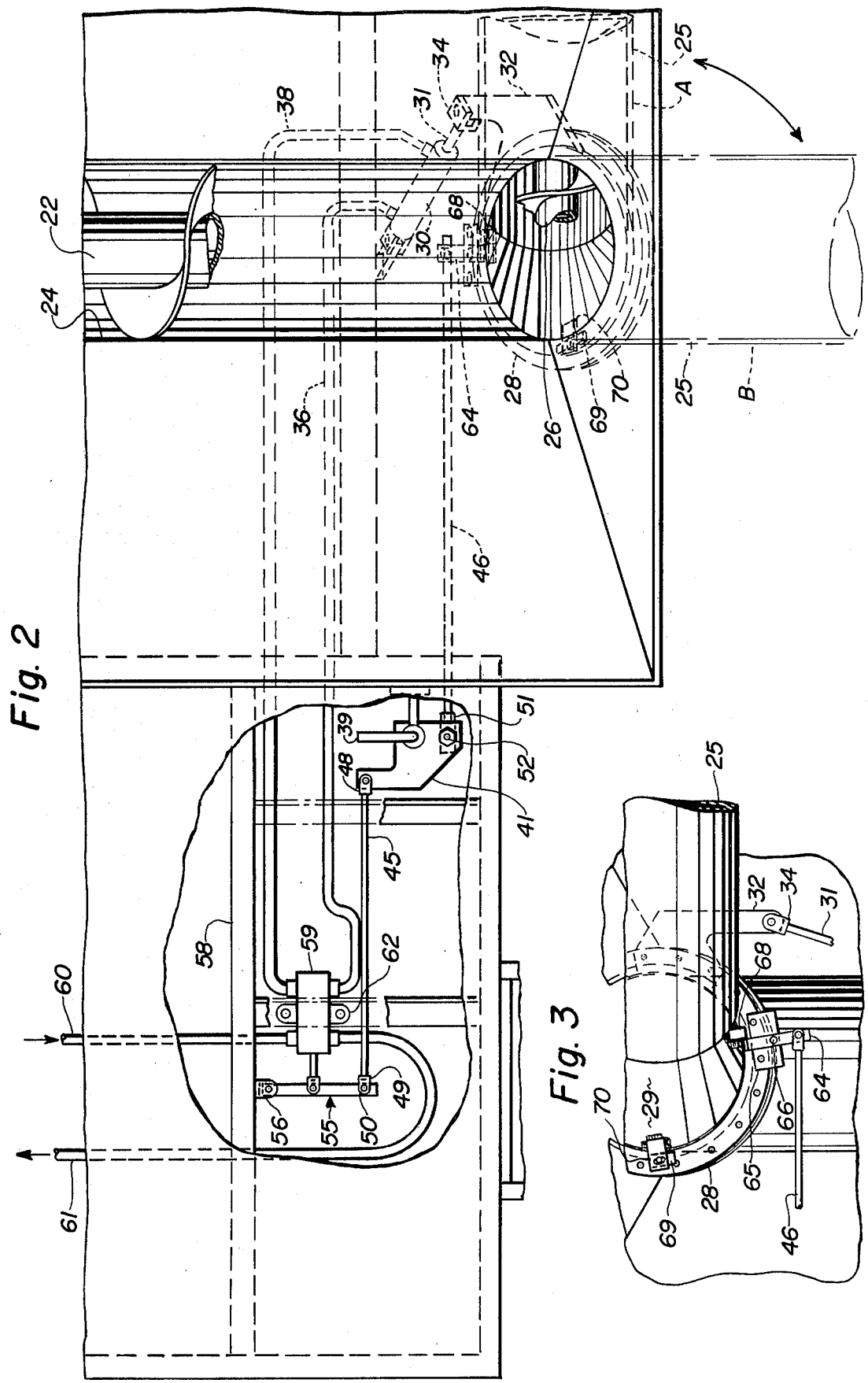

AUTOMATIC HYDRAULIC NEUTRALIZING MECHANISM

BACKGROUND OF THE INVENTION

This invention relates generally to crop harvesting and threshing machines, more commonly known as combines, and more particularly, to the apparatus used to control the unloading auger by which cleaned grain is unloaded from the grain tank to a receiving vehicle. Specifically, the invention is directed to a mechanical control mechanism which allows the combine operator to activate the unloading auger by momentarily engaging the unloading auger control, permitting the auger to rotate off of the auger switch and then releasing the control, thereby having the unloading auger swing from the fully inboard or storage position to a predetermined outboard position automatically for the unloading of grain. This invention is applicable to all types of combines which utilize some type of grain unloading tube that must move between predetermined positions of non-operation and operation.

Traditionally combines utilize a grain storage system that has the threshed and cleaned grain transported by means of a collection trough and auger to an elevator which carries the cleaned grain upward into a receiving receptacle or grain tank. The grain is continuously fed into the grain tank during the operation of the combine as it harvests and threshes crop material in the field. The continuous field operation of a combine is generally limited by the capacity of the grain tank to store the clean grain. When the grain tank is full, the combine operator must normally cease the harvesting and threshing operation to unload grain from the grain tank to a receiving vehicle. Occasionally, this unloading operation is conducted simultaneously with the continued harvesting and threshing by having a receiving vehicle move alongside the combine as it progresses down the field. The receiving vehicle may either be a wagon towed behind a tractor or a large grain truck. These receiving vehicles haul the unloaded grain to appropriate storage areas generally remote from the field. This procedure is repeated continuously during the harvesting and threshing of the crop material.

Combine operators normally activate the unloading system by engaging a lever or a switch which requires that the operator continue its engagement during the entire time that it takes the unloading tube to swing from its inboard to its outboard position. Should the unloading operation be conducted while the combine continues to harvest and thresh crop material this requires the operator to direct his attention to several functions at one time. The operator must continually monitor the crop material which is being harvested to the front of the combine as it moves across the field, scan the numerous monitors displayed on the combine control panel and observe the movement of the unloading tube from the inboard to the fully outboard position which is utilized for unloading. Since the operator must continue to steer the combine during this time, this means that the operator must remove one of his hands from the steering wheels and simultaneously conduct at least two operations. Obviously this is a difficult and distracting procedure which could inadvertently cause the operator to vary from his desired path across a field. At the least, the continuous engagement of the unloading tube control mechanism is an inconvenience.

Recently, a control system utilizing electromechanical apparatus was designed for a combine which required the operator to momentarily engage a control mechanism which then automatically controls the movement of the unloading auger between the inboard and fully outboard positions. However, this type of a system is relatively complex and costly.

The foregoing problems are solved in the design of the machine comprising the present invention by permitting the combine operator to engage the unloading tube control momentarily, thereby activating a mechanical system which will permit the unloading tube to automatically swing from the full inboard to the fully outboard position without any further operator involvement.

SUMMARY OF THE INVENTION

It is a principal object of the present invention to provide in a combine an improved mechanical control means for the grain tank unloading means which upon manual activation for a period of time substantially less than that required for the unloading means to move from a first position of non-operation to a second position in which unloading is performed, the control means is effective to automatically move the unloading means from the first position to the second position. Movement of the unloading means is automatically stopped.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a side elevational view of a crop harvesting and threshing machine with the improved unloading auger control means shown in phantom lines;

FIG. 2 is a top plan view in enlarged scale taken along the line 2—2 of FIG. 1 showing the mechanical linkages controlling the unloading auger within which is rotatably driven the unloading auger by the hydraulic cylinder;

FIG. 3 is a side elevational view of the unloading auger ring and the hydraulic cylinder control linkage.

FIG. 4 is an enlarged top plan view of the unloading auger control mechanism and the movable contact plate that moves in response to the setting of the unloading auger control;

FIG. 5 is an enlarged side elevational view taken along the lines 5—5 of FIG. 4 showing the relationship between the unloading auger and the movable contact plate;

FIG. 6 is a partially diagrammatic showing of the unloading auger control linkages and the hydraulic circuit utilized to move the unloading auger between the fully inboard and fully outboard positions.

DETAILED DESCRIPTION OF THE PREFERRED EMBODIMENT

FIG. 1 shows a combine indicated generally by the numeral 10 in a side elevational view with the critical portions of the instant invention partially shown in detail in phantom lines. It can be seen that the combine 10 has a mobile frame mounted to a pair of primary driving wheels 11 in the front and a pair of smaller steerable wheels 12 in the rear. It is powered by an engine (not shown) which is usually diesel fuel consuming. The engine is mounted to the upper portion of the combine in suitable fashion and, by means of drive belts or sprocket chains, is drivingly connected to the operational components of the combine.

The combine 10 generally has a header (not shown) and an infeed housing 14 mounted at its front, as seen in FIG. 1. The combine 10 has a main frame or housing indicated generally by the numeral 15, that internally supports threshing and separating means (not shown), as well as the operator's cab 16 and the grain tank 18. The operator's cab 16 extends forwardly over the front of the main frame 15 and overlies the infeed housing 14. The cab 16 has a ladder 19 which provides access for the operator to the cab and extends outwardly and downwardly therefrom. Housings 20 and 21 enclose the engine and the discharge beater and discharge grate assembly (both of which are not shown), respectively.

The structure thus far has been described generally since it is old and well known in the art. This structure and the interrelationships between the various operating components of the combine are described in greater detail in U.S. Pat. Nos. 3,626,472, issued Dec. 7, 1971; 3,742,686, issued July 3, 1973; and 3,995,645, issued Dec. 7, 1976; all to Rowland-Hill, hereinafter specifically incorporated by reference in their entirety, insofar as they are consistent with the instant disclosure.

The grain tank 18 has along its bottommost portion a horizontal grain tank unloading auger 22, best seen in FIG. 2, which is contained within an elongate, open-topped trough 24. As seen in FIGS. 1 and 2, the grain tank 18 has a pivotal unloading auger tube 25 within which is contained a rotatable auger 26, partially shown in FIG. 2. Tube 25 is fastened to the grain tank via an unloading auger ring 28 and a generally conically shaped intermediate connecting section 29, see briefly FIG. 3. This structure is shown and described in greater detail in U.S. Pat. No. 4,093,087, issued June 6, 1978, hereinafter specifically incorporated by reference in pertinent part insofar as it is consistent with the instant disclosure.

A double acting hydraulic cylinder 30, seen in its entirety in FIGS. 1 and 2, is fastened to the connecting section 29 of unloading auger tube 25 at the rod end 31 of the cylinder 30 via a mounting bracket 32 and double arm bracket 34. On its opposing end hydraulic cylinder 30 is fastened via bracket 35 and also via the double arm bracket 34 of FIGS. 2 and 3 to bracket 32, thereby movably connecting the cylinder 30 to brackets 32 and 35. Hydraulic lines 36 and 38 of FIGS. 1 and 3 lead into opposing ends of the piston end of hydraulic cylinder 30. Hydraulic cylinder 30, upon activation, pivotally moves the unloading auger tube 25 with its auger 26 from an inboard storage or transport position illustrated as A in FIGS. 1 and 2 to an outboard unloading position illustrated as B. Tube 25 at its furthermost end has a discharge opening 37 through which crop material passes into a receiving vehicle when the tube is in the outboard position and it is desired to unload the grain tank 18.

FIGS. 3, 4, and 5 best show the interrelationship of the unloading auger control arm 39 and the unloading auger hydraulic cylinder control linkage. Control arm 39 extends from the operator's cab down through the floor 40 of the cab 16 where it is fixedly fastened to contact plate 41. Control arm 39 passes through a hole in plate 41 and into a hub 42 which is welded to the underside of the plate. Pin 44, best shown in FIGS. 4 and 5, fastens the control arm 39 to the hub 42 and contact plate 41. Control arm 39 passes through a suitably shaped opening (not shown) in the floor 40 of cab 16 and is retained for rotational movement by a bearing 43 and a brace member 47. Member 47 is fastened to the support structure of the floor 40. The size of this opening supports the control arm 39 sufficiently to permit the contact plate 41 to pivot about the axis of the control arm 39 when it is rotated by the combine operator.

Contact plate 41 is movably joined via the appropriate fastenings to connecting links 45 and 46, best shown in FIGS. 2 and 4. Connecting link 45 has on its opposing ends double arm brackets 48 and 49, see FIG. 2, through which fastening pin 50 passes to secure the link for movement. Fastener 50 and double arm bracket 48 thus secure the one side of contact plate 41 for rotational movement about the axis of the control arm 39. The opposing side of contact plate 41 similarly has connecting link 46 coupled to it via a second double arm bracket 51 with a bolt and retaining nut indicated generally by the numeral 52.

Connecting link 45 extends forwardly from contact plate 41 where it connects via bracket 49, as seen in FIG. 2, to a T-bar control link indicated generally by the numeral 55. Link 55 is anchored on its one end via a pivotal bracket 56 to a floor support beam 58. The leg of the T-bar control linkage connects to the spool (not shown) of a hydraulic fluid directional control valve 59. Typically the spool works with a detent (also not shown) to maintain the valve in an open position for a predetermined amount of time while the unloading auger tube 25 is moved between positions A and B. The hydraulic fluid directional control valve 59 controls the flow of hydraulic fluid through hydraulic lines 36 and 38 to the double acting hydraulic cylinder 30. Hydraulic fluid is forced to flow by a hydraulic pump 33, seen in FIG. 6, into the directional control valve 59 from the onboard reservoir 37 via infeed line 60 and returns to the reservoir 37 from the control valve 59 via hydraulic line 61. Fluid directional control valve 59 is suitably fastened to the underside of the cab floor 40, such as by bracket 62.

As seen in FIGS. 2, 3 and 6, connecting link 46 extends rearwardly from contact plate 41 where it is fastened to a tab 64 mounted to the auger ring 28 of auger tube 25 by mounting bracket plate 65 so that it pivotally moves about pivot point 66 (see FIG. 3) in response to the pivotal movement of the contact plate 41 about the vertical axis of the control arm 39. A stop plate 68 is affixed to the intermediate connecting section 29 which serves to engage tab 64 when the unloading auger tube 25 returns to the inboard position illustrated as A in FIGS. 1 and 6 to move the T-bar control linkage 55 via connecting linkages 45 and 46 and contact plate 41 to stop the flow of hydraulic fluid to the hydraulic cylinder 30. Another stop plate 69 is fastened via a bracket 70 to the intermediate section 29, best seen in FIGS. 2 and 3, so that stop plate 69 engages tab 64 when the unloading auger tube has reached the fully outboard position indicated by the letter B in FIGS. 1 and 6 to stop the flow of hydraulic fluid to the hydraulic cylinder 30 in a similar fashion. Stop plate 69 may be adjustably fastened to mounting bracket 70 to permit stop plate 69 to engage the tab 64 within a controlled range and to correct minor manufacturing inaccuracies.

In operation, the operator drives the combine 10 across a field harvesting the crop material. When the grain tank 18 is filled with grain, the operator engages the control arm 39 within the operator's cab 16. Control arm 39, when turned in a counter-clockwise direction from its neutral or non-operating position, causes hydraulic fluid to flow through the hydraulic circuit into hydraulic cylinder 30 in such a manner as to cause the rod end to extend and rotate the unloading auger tube 25 and it unloading auger 26 from the inboard position illustrated as A to the outboard position illustrated as B. This counterclockwise pivoting of the control arm 39 causes the contact plate 41 to pivot about the vertical axis of control arm 39 and move the plate so that the link 45 is moved forwardly, causing the T-bar control link 55 to pivot about bracket 56. This causes the spool in the fluid directional control valve 59 to move to permit hydraulic fluid to flow through the circuit driving the hydraulic cylinder 30 rod end 31 to move the unloading auger tube 25 out away from the grain tank 18. When the unloading auger tube 25 has reached its fully outboard position, indicated by the letter B, stop plate 69 engages tab 64 causing it to pivot about pivot point 66 and forcing the spool within the hydraulic fluid directional control valve 59, via connecting linkages 45, 46 and T-bar control linkage 55, to return to the position that terminates the flow of hydraulic fluid through the hydraulic circuit connecting the hydraulic cylinder 30. Should the operator desire to return the unloading auger tube 25 and its unloading auger 26 to the fully inboard position, indicated as A, he merely turns the control arm in a clockwise direction. This returns the unloading auger to the inboard position A in the same general manner by the reversal of the flow of hydraulic fluid through the circuit is indicated immediately above. The flow of hydraulic fluid is terminated by the stop plate 68 engaging the tab 64, thereby causing the same sequence of events described above to occur again.

Thus, a simple, low cost mechanism is provided to automatically move the unloading auger tube 25 from the fully inboard position A to the fully outboard position B with only initial operator input to activate the system. The system functions similarly in moving the unloading auger tube from the outboard position B to the inboard position A. It should also be noted that a neutral safety switch could easily be incorporated with the gear shift mechanism so that the combine cannot be started unless the combine is in neutral.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention what is claimed is:

1. In a harvesting and threshing machine for harvesting crop material from the field, said machine having an operator station, the improvement comprising:
   a movable control arm in the operator's station;
   a plate movably connected to the machine, said arm fixedly connected to said plate;
   a fluid directional control valve connected to the machine;
   a first member interconnecting said plate and said valve;
   an auger tube including an unloading auger, said auger tube being movably connected to said machine via a stationary auger ring;
   a tab pivotally connected to said ring;
   a second member interconnecting said plate and said tab;
   a first stop connected to said auger tube;
   a second stop connected to said auger tube; and
   means for moving said auger tube and said stops into contact with said tab, said means being a fluid powered cylinder interconnected between said valve and said auger tube.

* * * * *